United States Patent
Fecteau

[19]

[11] Patent Number: 6,161,540

[45] Date of Patent: Dec. 19, 2000

[54] RESPIRATOR FILTER HAVING A PLEATED FILTER LAYER

[75] Inventor: Keith E. Fecteau, Wilbraham, Mass.

[73] Assignee: Cabot Safety Intermediate Corporation, Southbridge, Mass.

[21] Appl. No.: 09/067,579

[22] Filed: Apr. 28, 1998

[51] Int. Cl.⁷ .................................................. A62B 23/02
[52] U.S. Cl. ............................... 128/205.27; 128/205.29; 128/206.16; 128/206.19
[58] Field of Search ......................... 128/205.27, 205.29, 128/206.16, 206.19, 206.14; 55/524

[56] References Cited

U.S. PATENT DOCUMENTS

| | | |
|---|---|---|
| Re. 35,062 | 10/1995 | Brostrom et al. . |
| 2,295,119 | 9/1942 | Malcom et al. . |
| 3,802,429 | 4/1974 | Bird ................................... 128/206.19 |
| 4,355,637 | 10/1982 | Dyer ................................... 128/206.19 |
| 4,419,994 | 12/1983 | Hilton ................................ 128/206.16 |
| 4,807,619 | 2/1989 | Dyrud et al. ....................... 128/206.16 |
| 5,149,468 | 9/1992 | Hershelman . |
| 5,240,479 | 8/1993 | Bachinski . |
| 5,307,796 | 5/1994 | Kronzer et al. .................... 128/206.16 |
| 5,553,608 | 9/1996 | Reese et al. . |
| 5,641,555 | 6/1997 | Berrigan et al. . |
| 5,656,368 | 8/1997 | Braun et al. ....................... 128/206.29 |
| 5,658,641 | 8/1997 | Berrigan et al. . |
| 5,694,925 | 12/1997 | Reese et al. . |
| 5,699,792 | 12/1997 | Reese et al. . |
| 5,735,270 | 4/1998 | Bayer ................................ 128/206.14 |
| 5,765,556 | 6/1998 | Brunson ............................ 128/206.25 |

*Primary Examiner*—John G. Weiss
*Assistant Examiner*—V. Srivastava
*Attorney, Agent, or Firm*—Cantor Colburn LLP

[57] ABSTRACT

The filter medium of the present invention includes a pleated filter layer and a flat filter layer adjacent to the pleated filter layer. Both the pleated filter layer and the flat filter layer may contain a thermoplastic material allowing the filter layers to be joined using ultrasonic welding or heat sealing and facilitating manufacturing. The filter medium has a small height which makes it appropriate for use in flat fold respirators and flat filters.

14 Claims, 5 Drawing Sheets

RESPIRATOR FILTER HAVING A PLEATED FILTER LAYER

BACKGROUND OF THE INVENTION

1. Field of the Invention

The invention relates generally to respirator filters and in particular to a respirator filters including a pleated filter layer.

2. Prior Art

Filtration face masks or respirators are used in a wide variety of applications when it is desired to protect a human's respiratory system from particulates or noxious gases. Recent changes in the regulations governing respirator requirements (42 CFR 84) mandate that filter media must have efficiencies of 95% or higher when tested against either sodium chloride or DOP aerosol, at a prescribed concentration, flow rate and particle size distribution. When the filter surface area is small, it is difficult to meet this requirement without exceeding the maximum pressure drop requirements of the standard. Typically, glass fiber media are used against DOP aerosols to achieve the desired higher efficiencies. The pressure drops across these glass fiber media are high enough that pleating must be employed to increase the filter surface area in order to minimize the pressure drop. These filters are typically potted in cartridge shells in order to provide a means for sealing the filter in a holder. The resulting filter is expensive to manufacture.

Electrostatic media, comprised of polypropylene melt blown fibers, are effective against sodium chloride aerosols and have been further developed to be efficient against DOP aerosols. The advantage of the polypropylene media is that it can be welded with other filter layers, pre-filter layers or protective scrims to create filter disks which can be inserted into clips and covers for sealing against an adapter or cartridge. No secondary potting or adhesive compounds are needed. For applications where the surface area is low, however, the filter may still have a pressure drop which is higher than desirable. FIG. 1A is a cross sectional view of a conventional flat filter 15. The filter is made up of a flat filter layer 16 made from a fibrous, thermoplastic material (such as an acrylic, polyester, nylon, polypropylene). Adjacent to the first filter layer 16 is flat filter layer 17 made from melt-blown, thermoplastic material (such as polypropylene). A protective layer 18 (e.g. spun bonded polypropylene) is included on the outside of filter layer 17. A drawback to the filter of FIG. 1A is that there is a small filtering surface area and thus a high pressure drop across the filter. This makes the filter difficult to breathe through.

It is well known in the industry that pleating can be used to increase the amount of filtering surface within a given area. By pleating filter media such as that which is composed of polypropylene melt blown fibers, the effective filtration surface can be increased and the pressure drop reduced. FIG. 1B is a cross-sectional view of a filter element 1 as described in U.S. Pat. No. 5,736,041. The filter element 1 includes a pleated filter layer 2 covered on both sides by cover layers 3a and 3b. Cover layers 3a and 3b protect the pleated filter media and serve as spacers to keep the folds of the pleated filter layer 2 separate. Layers 2, 3a and 3b are enclosed in an envelope 5. A drawback to this filter is that because the filtration efficiency is dependent solely on the pleated media, the height of the pleats must be quite large, on the order of 20 mm, to achieve high efficiencies. This makes the filter element thick and bulky and does not allow for designs which are low profile.

SUMMARY OF THE INVENTION

The above-discussed and other drawbacks and deficiencies of the prior art are overcome or alleviated by the air filter of the present invention. The filter of the present invention includes a pleated filter layer and a flat filter layer adjacent to the pleated filter layer. Both the pleated filter layer and the flat filter layer may contain thermoplastic material. This allows the filter layers to be joined using ultrasonic welding or heat sealing and facilitates manufacturing. The filter has a small height which makes it appropriate for use in flat fold respirators and flat filter elements.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several FIGURES.

DETAILED DESCRIPTION OF THE INVENTION

Figure 2:
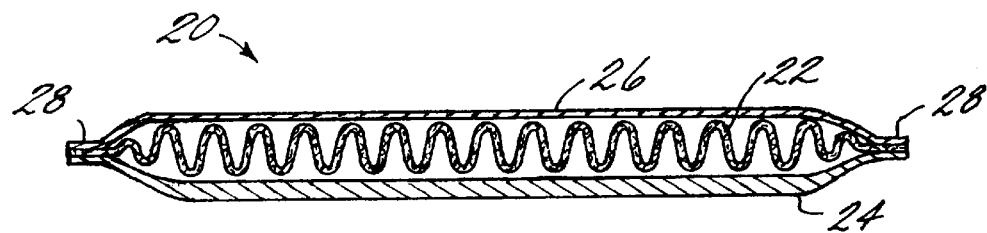
FIG. 2 is a cross-sectional view of a filter in accordance with the present invention.

FIG. 2 is a cross-sectional view of a circular filter show generally at 20 including a filter medium in accordance with the present invention. The filter medium may be used in any type of respirator. The term respirator, as used herein, refers generally to a wide class of products including, but not limited to, flat fold, cup-type, fill and partial face, etc. The filter medium within filter 20 includes a pleated filter layer 22. The pleated filter layer 22 can be a mechanical filter layer (e.g. glass fiber) containing a thermoplastic binder or a thermoplastic material. In an exemplary embodiment, layer 22 is a melt-blown, thermoplastic layer (such as polypropylene) which can be electrostatically charged to attract particulates or chemically treated to resist oils. The filter layer 22 is pleated by folding the filter material in alternating directions along parallel fold lines. The distance between adjacent fold lines establishes the height of the pleated filter layer 22. The filter medium also includes a second filter layer 24 which is flat (not pleated). The second filter layer 24 can be a mechanical filter layer (e.g. glass fiber) containing a thermoplastic binder or a thermoplastic material. In an exemplary embodiment, the second filter layer 24 is made from a fibrous, thermoplastic material (such as an acrylic, polyester, nylon, polypropylene) which can also be electrostatically charged or can be chemically treated to resist oils. A protective layer 26 (e.g. spun bonded polypropylene) is included on the outside of the pleated filter layer 22 to protect the pleats from damage. The pleated filter layer 22, the second filter layer 24 and the protective layer 26 can be ultrasonically welded or heat sealed at edge 28.

Figure 2A:
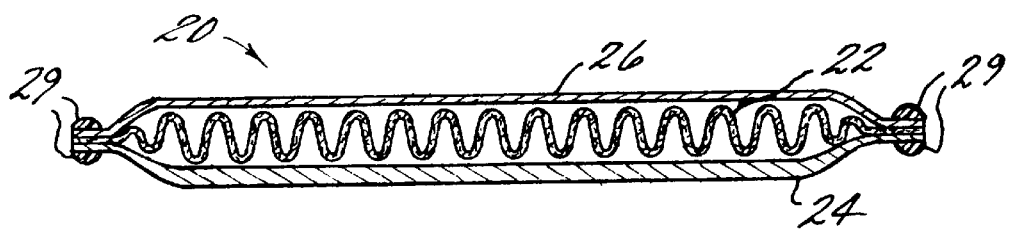
FIG. 2A is a cross-sectional view of an alternative filter in accordance with the present invention.

Edge 28 has a flat surface on the top and the bottom. Having at least one flat surface allows the filter 20 to achieve a positive seal against a filter holder or against the face of a chemical cartridge. The filter 20 would be mounted in filter cartridges using conventional mechanisms such as filter clips or a threaded cover. The filter 20 has a low pressure drop, and requires no potting compounds to achieve a seal. FIG. 2A shows an alternative embodiment in which an sealing gasket 29 is added to the flat surface 28 on one or both sides of the filter element. The sealing gasket 29 is used to improve the seal of the filter element 20 against a filter holder or cartridge in high efficiency applications where leakage is a concern. In an exemplary embodiment, gasket 29 is an elastomeric ring ultrasonically welded to the flat surface 28.

Figure 3:
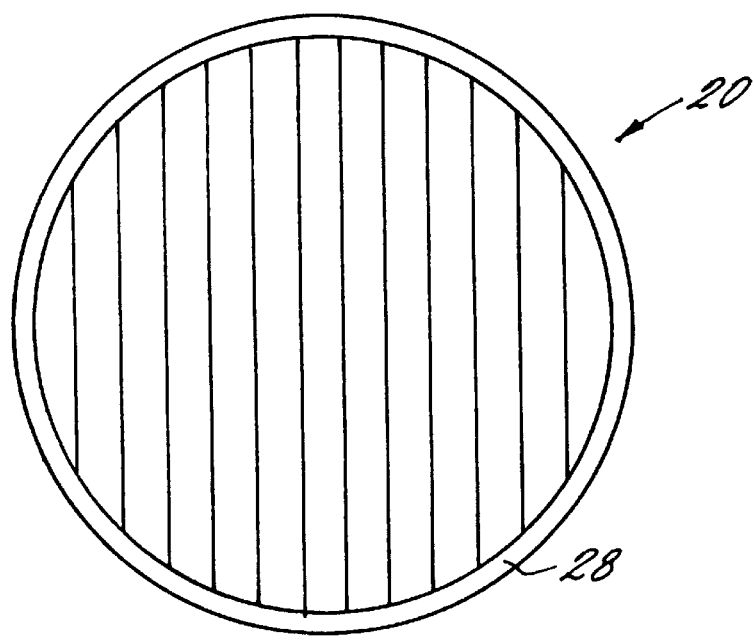
FIG. 3 is a top view of the filter of FIG. 2.

An exemplary embodiment of the filter 20 is made up of a pleated filter layer 22 containing 2 layers of 30 gram/sq. meter of polypropylene melt-blown fibers pleated to a pleat height of approximately 5 mm, and having a pleat spacing resulting in 6–8 pleats per inch. The second filter layer 24 is a mod-acrylic electret filter media, for example, 400 gram/ square meter Technostat (Hepworth Filtration Products) or Floclean 2000 (AFFCO). A protective layer 26 of spun bonded polypropylene is included on the outside of the pleated filter layer 22 to protect the pleats from darnage. All three layers are joined by ultrasonic welding which results in a flat surface 28 (shown in FIG. 3) on the outer perimeter of the filter and which has a width of 1/16 to 1/8 of an inch. As noted above, the flat surface 28 provides a surface for sealing the filter 20 against a filter holder or against the face of a chemical cartridge. It is understood that filter 20 need not be circular but may have a variety of geometries (square, rectangular, oval, triangular, etc.) depending upon the application.

Figure 1A:
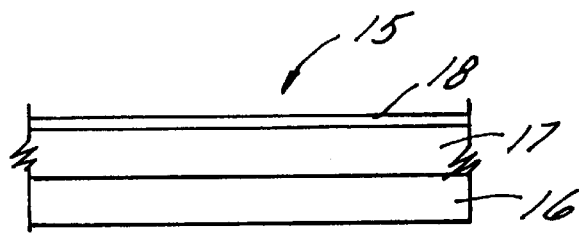
FIG. 1A is a cross-sectional view of a conventional filter media.
Figure 1B:
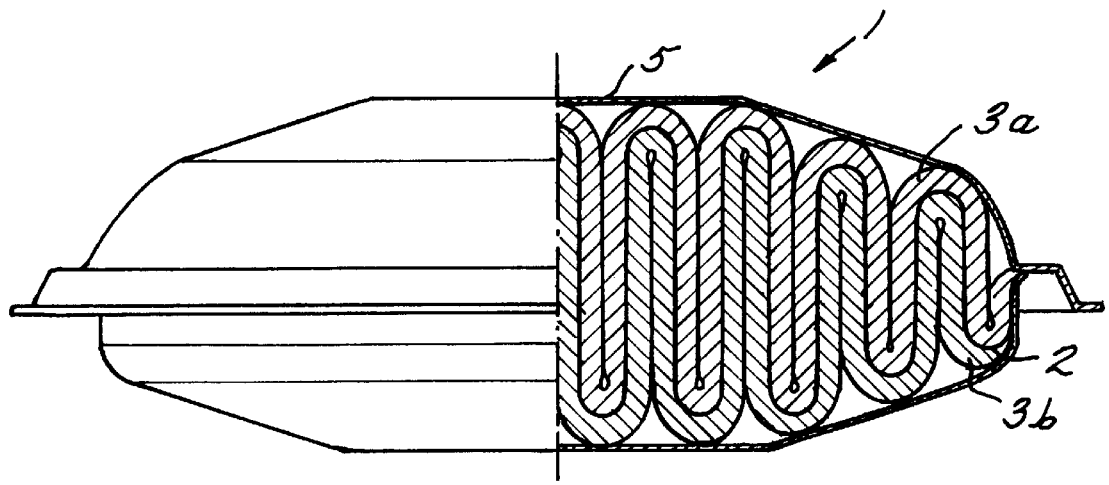
FIG. 1B is a cross-sectional view of a conventional filter.

An advantage of the present invention is the elimination of the need for spacers to keep the pleats of the folded filter layer 22 separate. Due to the low pleat height (approximately 5 mm), there is no need to use physical devices (such as covers 3a and 3b in FIG. 1B) to maintain separation between the individual pleats. This reduces the complexity of the filter media and it cost to manufacture.

Figure 4:
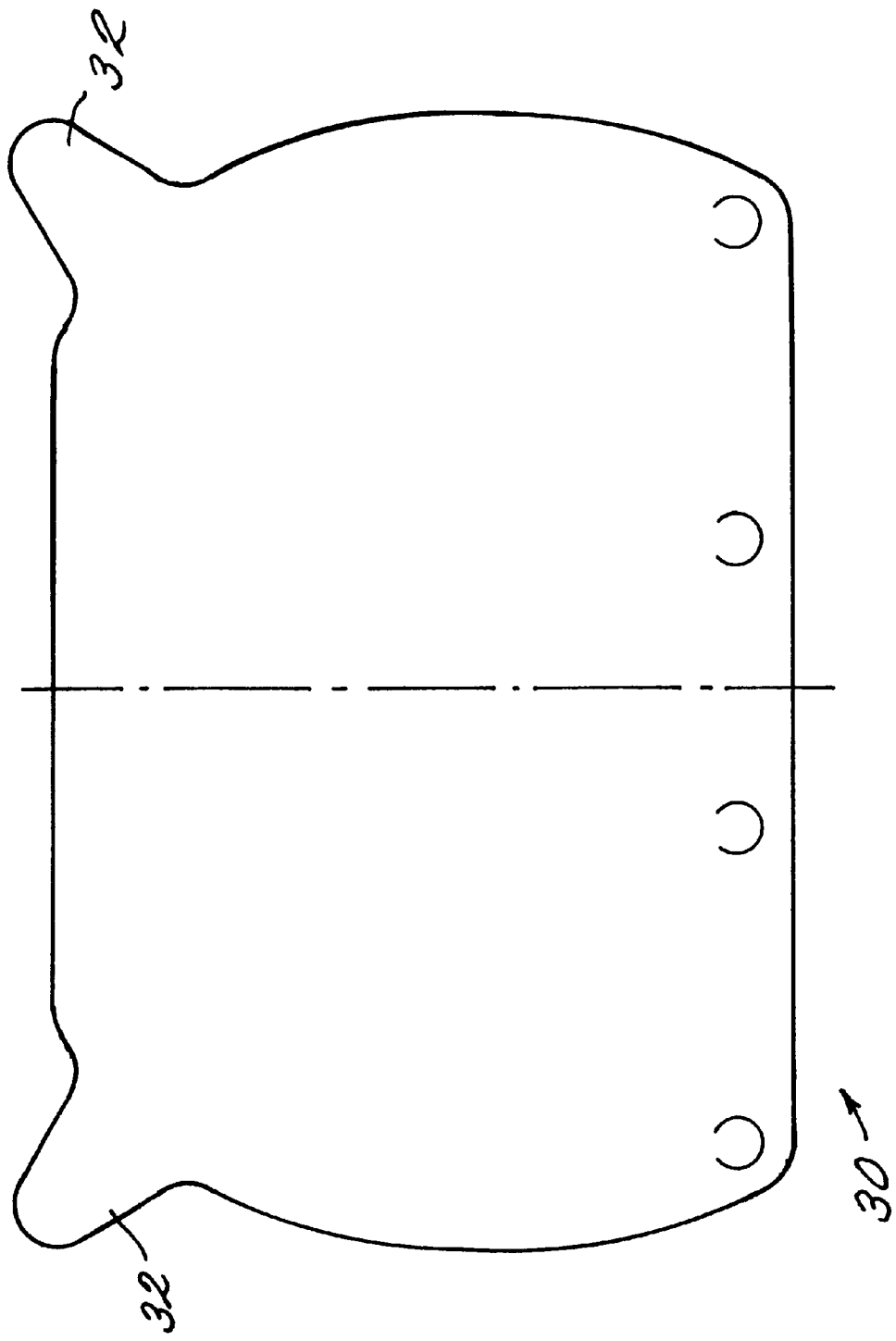
FIG. 4 is a top view of a flat fold filter blank.
Figure 5:
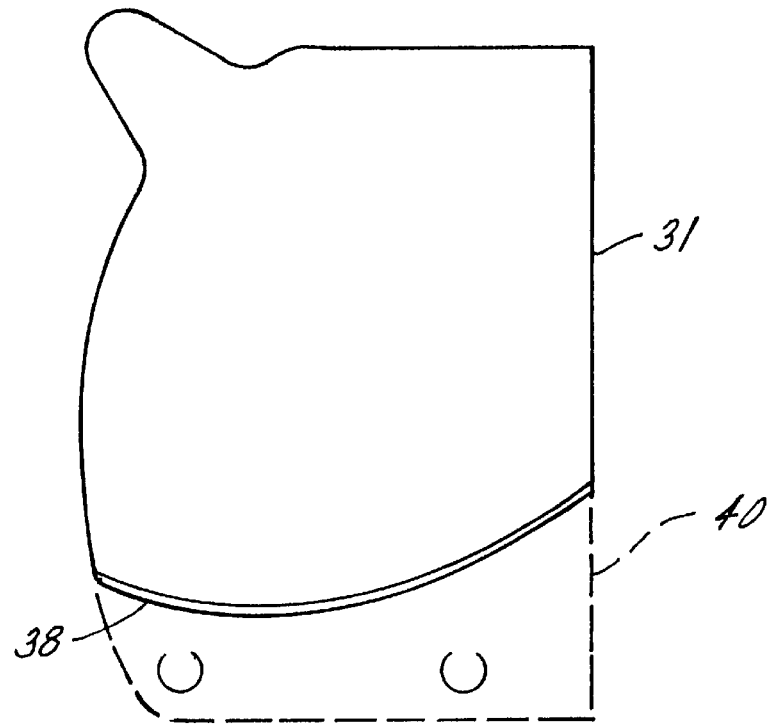
FIG. 5 is a top view of the flat fold filter blank during manufacturer of a flat fold filter.

Because the pleated filter layer 22 of FIG. 2 has a small height (approximately 5 mm), it can be used in a vertical or horizontal flat fold respirator. FIG. 4 is a top view of a blank 30 for forming a vertical flat fold respirator. The blank 30 includes two tabs 32 that hold a strap as described below. To form the flat fold respirator, the blank 30 is folded along its center line as shown in FIG. 5 to form a fold line 31. A portion 40 of the blank is removed and a sealed edge 38 is formed through ultrasonic welding or heat sealing. Lastly, a strap (not shown) is placed in strap tabs 32 and strap tabs 32 are folded towards the flat fold respirator and sealed to the respirator through ultrasonic welding or heat sealing to form the respirator shown in FIG. 6. A foam flange can be formed around the perimeter of the flat fold respirator to provide an improved seal against the face of the wearer.

Figure 6:
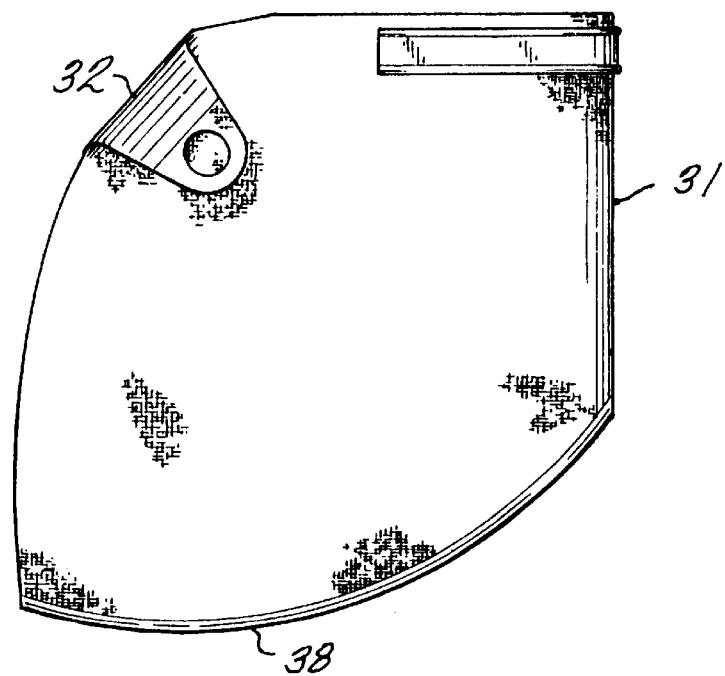
FIG. 6 is a top view of the completed flat fold filter.
Figure 7:
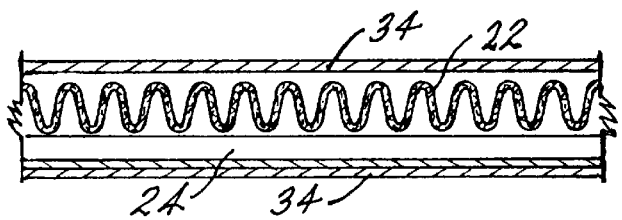
FIG. 7 is a cross sectional view of the flat fold filter.
Figure 7A:
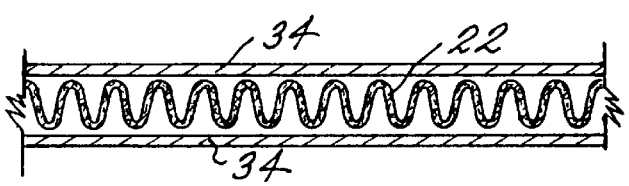
FIG. 7A is a cross sectional view of an alternative flat fold filter.

FIG. 7 is a cross sectional view of a portion of the flat fold respirator of FIG. 6. As shown in FIG. 7, the flat fold respirator includes the pleated filter layer 22 and the second filter layer 24 described above with reference to FIG. 2. The pleated filter layer 22 and the second filter layer 24 contain thermoplastic materials and can be ultrasonically welded or heat sealed with protective layers 34 (e.g. spun bonded polypropylene). The folds of the pleated filter layer 24 are parallel to the fold line 31 and the pleated filter layer is pliable enough to fold along fold line 31. An alternative filter media is shown in FIG. 7A in which the second filter layer 24 is eliminated and only the pleated filter layer 22 and the protective layers are used. This would provide a filter that is easier to breathe through.

Additional layers such as protective scrims or other filtration or chemical adsorption layers may be ultrasonically welded or heated sealed to either the pleated filter layer 22 or the second filter layer 24. These additional layers may be located upstream or downstream from the contaminants from which the wearer is being protected and may or may not be pleated. By pleating the melt-blown filter layer 22, its surface area is increased (e.g. three times its original area) and the resulting respirator is highly efficient and has a low resistance to airflow making it comfortable for the wearer. The respirator may include a conventional exhalation valve to facilitate the removal of exhaled breath. Although the invention has been described with reference to a vertical flat fold respirator, it is understood that a similar construction would apply to a horizontal flat fold respirator.

The filter medium of the present invention may also be used in filter masks having flat, replaceable filters (known as "pancake" filters). U.S. Pat. No. Re. 35,062 describes a conventional replaceable filter which is flat and circular. These types of filters are described as being adapted for attachment to a respirator face piece. The filter includes front and rear walls of filter material, a breather tube, and a porous inner layer which maintains the front and rear walls in a spaced apart relationship over substantially their entire area and which functions to evenly distribute air flow across the available filter surface area. The breathing tube is fixed to the rear wall of the filter, can attach to the face piece, and allows filtered air to be pulled through the filter medium and into the face piece.

The advantage of this conventional design is that the diameter of the filter is minimized since both the front and rear surfaces are used for filtration. However, to meet the filtration requirements for high efficiency or N100, R100 or P100 filters (99.97% against NaCl or DOP aerosol according to NIOSH 42 CFR 84) the diameter of such a filter must still be in the range of 4 inches. This interferes with visibility, particularly if the breathing tube is centered on the rear surface of the filter. Also, because the conventional medium is flat, the pressure drop is difficult to minimize without making the filter even larger in diameter.

Figure 8:
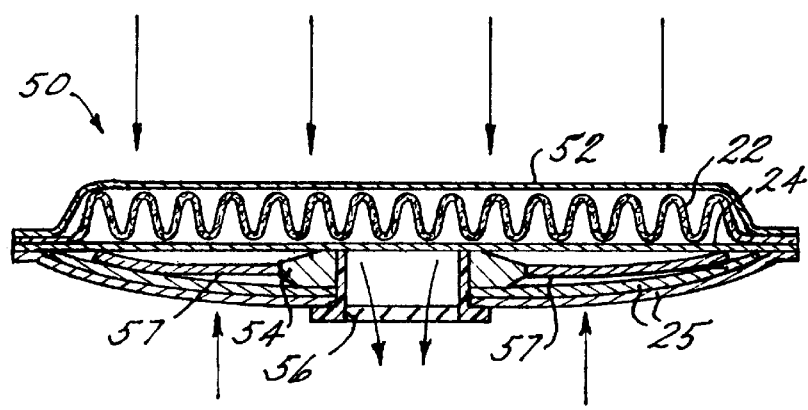
FIG. 8 is a cross section view of a flat filter element.

The filter medium of the present invention may be included in a flat filter 50 having air flow over both surfaces as shown in FIG. 8 for use with face masks such as that described in U.S. Pat. No. Re. 35,062. The filter 50 of FIG. 8 includes a front filter medium made up of a pleated filter layer 22 adjacent to an optional second filter layer 24 as described above with respect to FIG. 2. The front surface of the filter element 50 includes a protective layer 52. The rear filter medium of the filter element 50 is made up of one or more layers of flat filter material 25 similar to second filter layer 24 described above with reference to FIG. 2. Separators 54 are placed around breathing tube 56 to maintain separation between the front filter medium and the rear filter medium. The arrows in FIG. 8 indicate the air flow through the front and rear surfaces of filter element 50, passing through the front filter medium and exiting through breathing tube 56 as is known in the art.

To minimize the profile of the filter 50, the height of the pleated filter layer 22 should be in the range of 4–6 mm. The pleated filter layer 22 may be composed of one or more layers of a polymeric melt blown media (such as polypropylene), which may have an electrostatic charge and which may be treated to have a low surface tension (i.e.

hydrophobic). If the pleat spacing is maintained in the range of 6–8 pleats per inch, the resulting filter medium will have three times the surface area on at least one of its faces. The resulting filter will have a lower pressure drop than prior art filters, thus making it easier to breathe through and more comfortable. It can also be made smaller in diameter to improve visibility. The breathing tube 56 can also be installed off center, and the filter 50 positioned on the face piece to maintain the element outside of the range of vision.

The pleated filter layer 22 and the flat filter layers 24 and 25 preferably contain a thermoplastic material to allow joining these layers through ultrasonic welding or heat sealing. The breathing tube 56 is constructed of a thermoplastic material, preferably polypropylene, which can be sealed around its perimeter to adjacent filter material. The breathing tube 56 may also include separators 57 which run perpendicular to the pleats of the pleated filter layer 22, to maintain a separation between the front filter medium and the flat surface of the rear filter medium. One or more of the pleated filter layer 22, the flat filter layer 24 and the flat filter layers 25 may be impregnated with a sorbent for the removal of gases and vapors.

The present invention provides a filter medium having at least one pleated filter layer and one flat filter layer. The pleated filter layer has an increased surface area and thus reduces the breathing resistance. The combination of a pleated filter layer and a flat filter layer allows the filter medium to have a reduced height and thus be used in flat fold respirators or flat filters for use with face masks.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A filter medium for use in a respirator comprising:

a pleated filter layer containing a thermoplastic material, said pleated filter layer including a plurality of pleat fold lines therein; and a flat filter layer containing a thermoplastic material wherein said pleated filter layer and said flat filter layer are joined at an edge, said edge having at least one flat surface; and, a sealing gasket mounted to one side of said flat surface for sealing said pleated filter layer against a filter holder.

2. The filter medium of claim 1 wherein said flat filter layer is adjacent to said pleated filter layer.

3. The filter medium of claim 1 wherein said pleated filter layer is melt-blown polypropylene.

4. The filter medium of claim 1 flirter comprising a protective layer adjacent said pleated filter layer.

5. The filter medium of claim 1 wherein said pleated filter layer is electrostatically charged.

6. The filter medium of claim 1 wherein said pleated filter layer is chemically treated to resist oils.

7. The filter medium of claim 1 wherein said flat filter layer is electrostatically charged.

8. The filter medium of claim 1 wherein said flat filter layer is chemically treated to resist oils.

9. The filter medium of claim 1 further comprising a further sealing gasket mounted to another side of said flat surface.

10. The filter medium of claim 1 wherein:

said respirator is a flat fold respirator and said filter includes a first protective layer adjacent said pleated filter layer and a second protective layer adjacent said flat filter layer.

11. The filter medium of claim 10 wherein said filter is a vertical flat fold filter having a fold line.

12. The filter medium of claim 11 wherein at least one of said plurality of pleat fold lines being parallel to said fold line.

13. The filter medium of claim 1 wherein:

said respirator is a cup-type respirator.

14. The filter medium of claim 1 wherein said gasket is an elastomeric member.

\* \* \* \* \*